United States Patent [19]

Noudan

[11] Patent Number: 4,891,703
[45] Date of Patent: Jan. 2, 1990

[54] METHOD AND SYSTEM FOR DETERMINING VIDEO PROGRAM SYSTEM SIGNALS

[75] Inventor: Yoshimasa Noudan, Kumagaya, Japan

[73] Assignee: Kabushiki Kaisha Toshiba, Kawasaki, Japan

[21] Appl. No.: 247,604

[22] Filed: Sep. 22, 1988

[30] Foreign Application Priority Data

Sep. 30, 1987 [JP] Japan .................................. 62-246034

[51] Int. Cl.$^4$ ........................ H04N 7/087; H04N 7/08
[52] U.S. Cl. .................................... 358/142; 358/147;
455/70; 371/5.1; 371/48
[58] Field of Search ................ 358/142, 143, 144, 145,
358/146, 147, 194.1; 455/4, 68, 70, 140, 151,
603; 371/5, 48, 55, 67, 69, 71

[56] References Cited

U.S. PATENT DOCUMENTS 4,479,146  10/1984  Cohn ................................... 358/147
4,706,121  11/1987  Young ................................. 358/146

FOREIGN PATENT DOCUMENTS 3038088  9/1982  Fed. Rep. of Germany .
3341412  5/1985  Fed. Rep. of Germany .
3439941  8/1985  Fed. Rep. of Germany .
3511737  10/1986  Fed. Rep. of Germany .
57-24179  2/1982  Japan .

Primary Examiner—John W. Shepperd
Assistant Examiner—Michael D. Parker
Attorney, Agent, or Firm—Cushman, Darby & Cushman

[57] ABSTRACT

A video program system (VPS) signal superimposed on a television signal is continuously stored in an input buffer. A determination process circuit determines whether or not the VPS signal stored in the input buffer is a normal signal. When the VPS signal stored in the input buffer is a no-signal, a count value of a no-signal counter is counted. When the count value of the no-signal counter exceeds a predetermined count value, the circuit determines that the VPS signal detected from the television signal is the no-signal. When VPS signals corresponding to various programs are stored in the input buffer, a count value of an error counter is counted. When the count value of the error counter exceeds a predetermined count value, the circuit determines that the input state of the VPS signal detected from the television signal is unstable. When the same VPS signal is continuously stored in the input buffer, the circuit determines that the VPS signal detected from the television signal is a normal signal.

8 Claims, 9 Drawing Sheets

BIT 0, 1 ---- ADDRESS RANGE
BIT 2~6 ---- DAY INFORMATION
BIT 7~10 ---- MONTH INFORMATION
BIT 11~15 ---- HOUR INFORMATION
BIT 16~21 ---- MINUTE INFORMATION
BIT 22~25 ---- NATIONALITY CODE
BIT 26~31 ---- PROGRAM SOURCE CODE

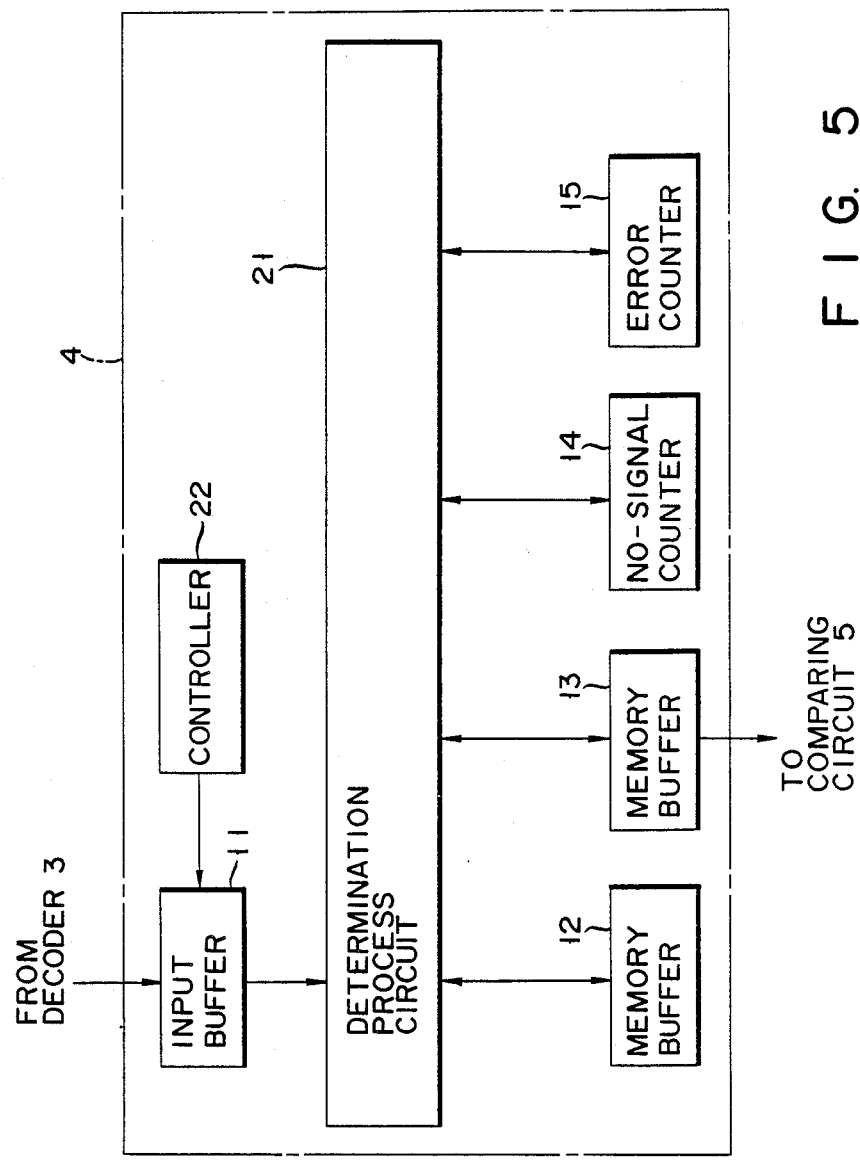

METHOD AND SYSTEM FOR DETERMINING VIDEO PROGRAM SYSTEM SIGNALS

BACKGROUND OF THE INVENTION

1. Field of the Invention

The present invention relates to a method and system for determining video program system (VPS) signals detected from television signals.

2. Description of the Related Art

It has been put to practical use to allocate a VPS signal to each of television programs and to detect and determine the VPS signal (see FIG. 1A), which has been superimposed on a specific line in a vertical-blanking interval of a television signal prior to the start of broadcasting of the program, in order to control various types of TV signal receiving equipment. As shown in FIG. 1B, the VPS signal is represented by 1-15 word data, and the word data (word numbers 11-14) in current use includes the broadcasting data (the month, day and hour), the nationality code of a broadcasting station, a program source code, etc, which are previously published in a television program guide and assigned to each of programs. For example, by means of the VPS signal a TV is turned on and a video tape recorder (VTR) is controlled in a recording mode.

To control TV signal receiving equipment by means of VPS signals as described above, this receiving equipment decodes a received VPS signal and determines whether or not a program source code obtained by the decoding corresponds to a preset program source code. Therefore, it is necessary for the receiving equipment to accurately detect the VPS signal. However, by mixed with noise, the VPS signal may become difficult to detect.

A example of a determination circuit for VPS signals is shown in German Offenlegungsschrift (Document open for inspection) DE-OS.3,511,737. The determination circuit includes a memory, a comparing circuit, and a counter. A detected VPS signal is stored in the memory, compared with a next detected VPS signal. When the VPS signal stored in the memory coincides with the next detected VPS signal, the counter is incremented by one. When no coincidence occurs between these VPS signals, the counter is reset. By the above process, a count value of the counter is obtained when the same VPS signal is successively detected. When a predetermined count value is counted by the counter, the determination circuit determines that the VPS signals correspond to a program being broadcast. The another samples of a known determination circuit for VPS signals is shown in FIG. 2. The determination circuit determines by using the majority of VPS signals, and includes input buffer 16, counters 17a, 17b and 17c, no-signal counter 18, determination process circuit 19 and controller 20. Controller 20 is constructed of a central processing unit (CPU) and the like and controls the timing of access to input buffer 16. The determination of VPS signals is performed in accordance with a flowchart as shown in FIG. 3.

In FIG. 3, when a VPS signal determination process is started, a VPS signal is detected from a television signal and input into input buffer 16 at a specified timing by a control signal output from controller 20 (step S1). The VPS signal input into input buffer 16 is regarded as a VPS signal for a program A, counter 17a is incremented by one (step S5). Determination process circuit 19 determines whether or not a next VPS signal input into input buffer 16 coincides with the VPS signal for the program A (step S2). In step S2, when the next VPS signal corresponds to the program A, counter 17a is incremented by one (Step S5). In step S2, if the next VPS signal does not correspond to the program A, the next VPS signal is regarded as a VPS signal for a program B, counter 17b is incremented by one (step S6). Similarly, determination process circuit 19 determines whether or not a new VPS signal input into input buffer 16 coincides with the VPS signal for programs A or B (step 2, step S3). When the new VPS signal corresponds to the program A, counter 17a is incremented by one (step S5). When the new VPS signal corresponds to the program B, counter 17b is incremented by one (step S6). If the new VPS signal does not correspond to the programs A and B, the new VPS signal is regarded as a VPS signal for a program C, counter 17c is incremented by one (step S7). When a VPS signal input into input buffer 16 corresponds to the program C (step S4), step S7 is performed. When the VPS signal input into input buffer 16 does not correspond to any one of programs A, B and C, for example, when the VPS signal is a no-signal, no-signal counter 18 is incremented by one (step S8).

The above process is performed at regular intervals and continued for a predetermined period (step S9). When the input of the VPS signal into input buffer 16 for the predetermined period is completed (step S9), step S10 is then performed.

In step S10, the VPS signal is detected which corresponds to a counter having a maximum count value among counters 17a, 17b and 17c and no-signal counter 18. For example, when the count value of counter 17a is maximum, the VPS signal for program A has been detected most frequently during the predetermined period. As a result, the conventional determination circuit determines that a program being broadcast is A.

However, the conventional determination procedure for the VPS signals involves the following problems.

For example, when television signals are received unstably, VPS signals will also become unstable and thus may not be determined. In such a case, the determination procedure as shown in FIG. 3 will fail to determine any of VPS signals corresponding to programs in each of steps S2, S3 and S4, increasing the count value of no-signal counter 18. For example, if normal VPS signals are detected only two times during five determination processes, then no-signal counter 18 will count three times. Thus, determination circuit would be determined that the VPS signal is not superimposed upon a television signal being received.

From the above, an apparatus is desired which is capable of accurately detecting and determining VPS signals from received television signals.

SUMMARY OF THE INVENTION

It is an object of the present invention to provide a method and system for determining a video program system signal detected from a television signal.

According to one aspect of the present invention, there is provided a method for determining a video program system signal detected from a television signal, the method comprising the steps of: storing the video program system signal detected from the television signal; determining whether or not the stored video program system signal is a no-signal; counting a no-signal count value when the stored video program system signal is the no-signal; outputting the no-signal when the no-signal count value exceeds a first predetermined count value; determining whether or not the stored video program system signal is a normal signal; counting an error count value when different video program system signals are stored; outputting the no-signal when the error count value exceeds a second predetermined count value; and outputting the stored video program system signal when the predetermined number of normal signals is continuously stored except for the storage of the predetermined number of no-signals.

According to another aspect of the present invention, there is provided a system for determining a video program system signal detected from a television signal, the system comprising: input buffer means for storing the video program system signal detected from the television signal; determining means for determining the video program system signal stored in the input buffer means; memory buffer means for storing the video program system signal stored in the input buffer means in accordance with a determination result obtained by the determining means; error counter means for counting an error count value in accordance with the determination result obtained by the determining means; and no-signal counter means for counting a no-signal count value in accordance with the determination result obtained by the determining means.

BRIEF DESCRIPTION OF THE DRAWINGS

FIG. 5 is a block diagram of the VPS signal determination circuit of FIG. 4;

DETAILED DESCRIPTION OF THE PREFERRED EMBODIMENTS

Figure 1A:
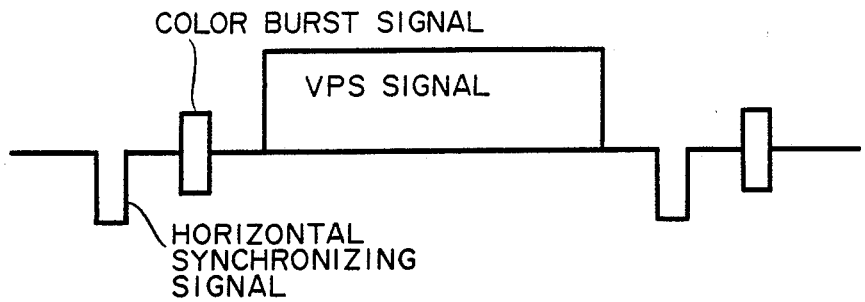
FIGS. 1A and 1B are diagrams for explaining a general VPS signal.
Figure 1B:
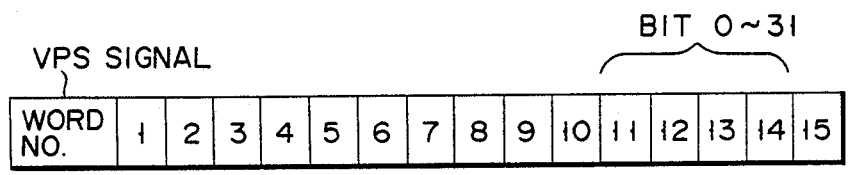
Figure 2:
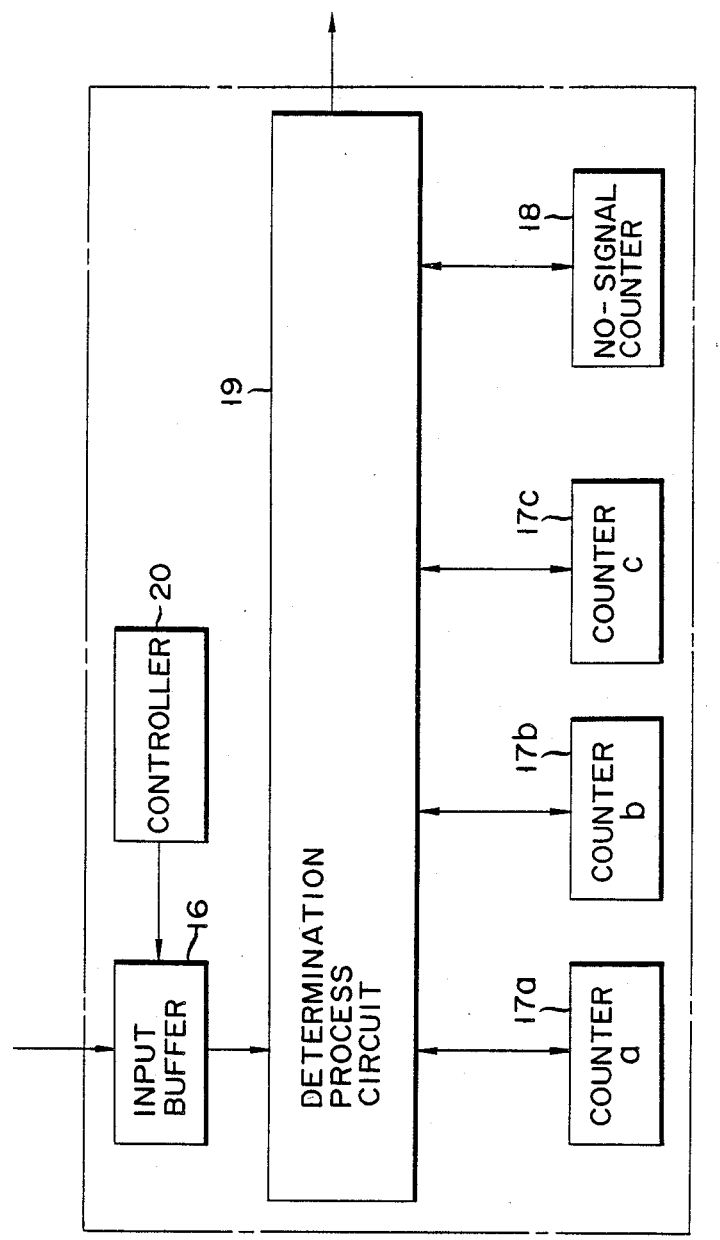
FIG. 2 is a block diagram of a conventional VPS signal determination circuit.
Figure 3:
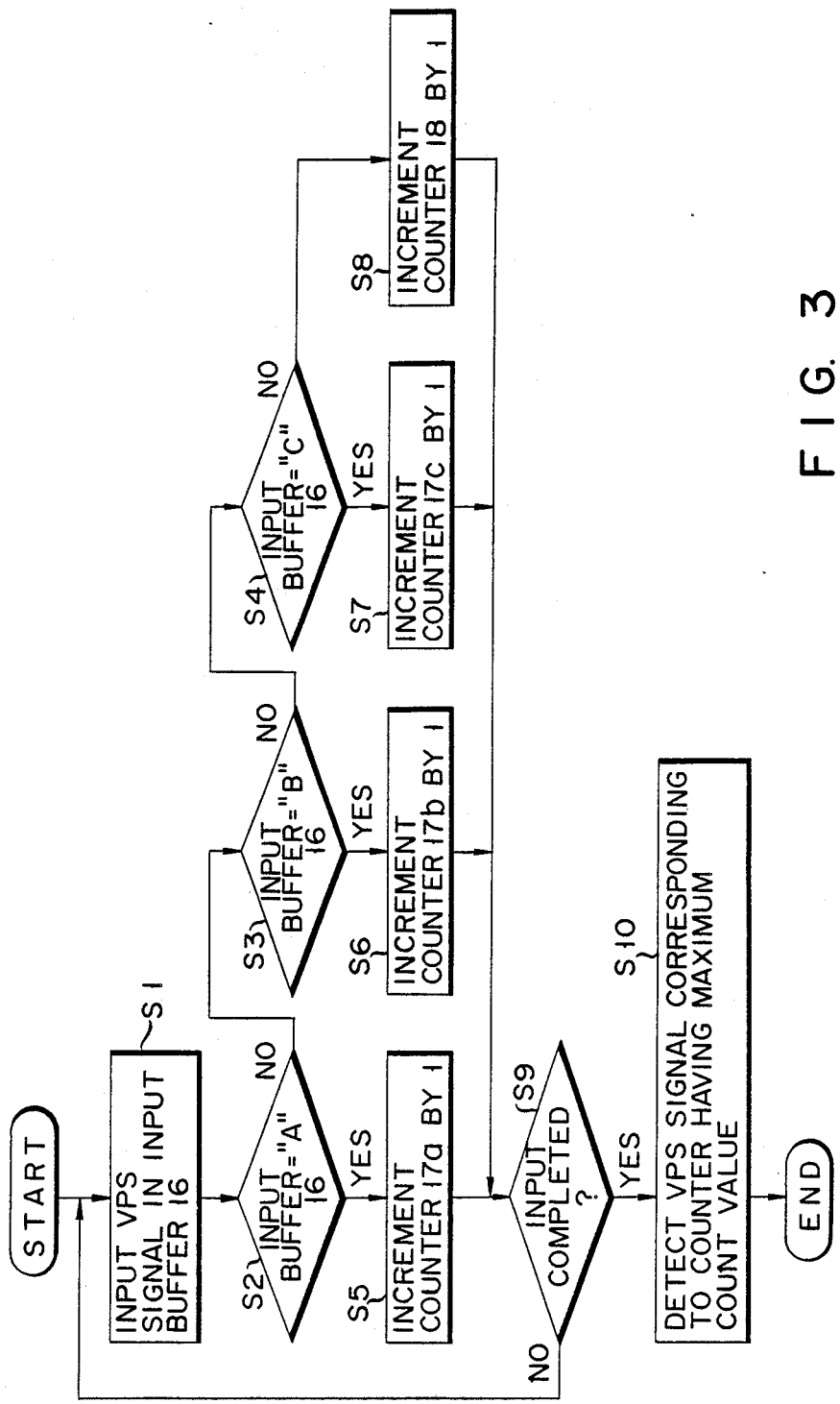
FIG. 3 is an operational flowchart for determining VPS signals used with the conventional determination circuit.
Figure 4:
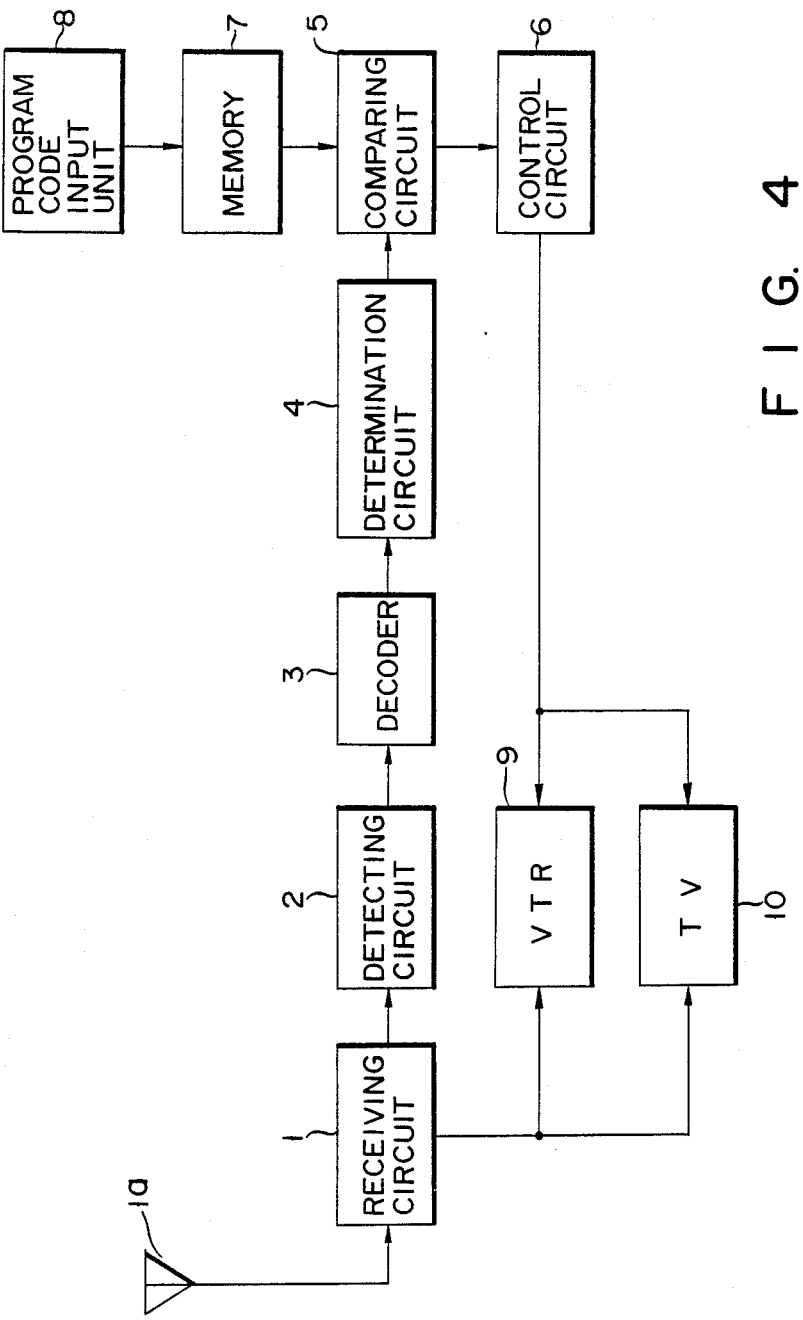
FIG. 4 shows an arrangement of a system of the present invention.

Referring now to FIG. 4, a television signal received by receiving circuit 1 through antenna 1a is applied to detecting circuit 2, VTR 9 and TV 10. Detecting circuit 2 detects a VPS signal from the television signal and outputs the VPS signal to a decoder 3. The VPS signal decoded in decoder 3 is applied to determination circuit 4. Determination circuit 4 determines whether or not the decoded VPS signal is a VPS signal to be used to control VTR 9 and TV 10. On the other hand, a program code is input by program code input unit 8 and then stored in memory 7. When determination circuit 4 determines that the VPS signal is to be used for controlling VTR 9 and TV 10, a program code corresponding to the VPS signal is compared with the program code read out from memory 7 by comparing circuit 5. When a coincidence occurs between the program code corresponding to the VPS signal and the program code read out from memory 7, the comparative result is output to control circuit 6. Control circuit 6 is formed of a microprocessor and the like and produces a control signal to operate VTR 9 and TV 10 in accordance with the comparative result output from comparing circuit 5. VTR 9 and TV 10 respond to the control signal so that the former operates in the recording mode and the latter turns on, for example.

The operation for determining normal VPS signals in the present system as described above will be described hereinafter.

Referring to FIG. 5, determination circuit 4 comprises input buffer 11, memory buffers 12 and 13, no-signal counter 14, error counter 15, determination process circuit 21 and controller 22. Determination circuit 4 performs the determination of VPS signals in accordance with such flowcharts as shown in FIGS. 6A and 6B and FIG. 7.

Figure 6A:
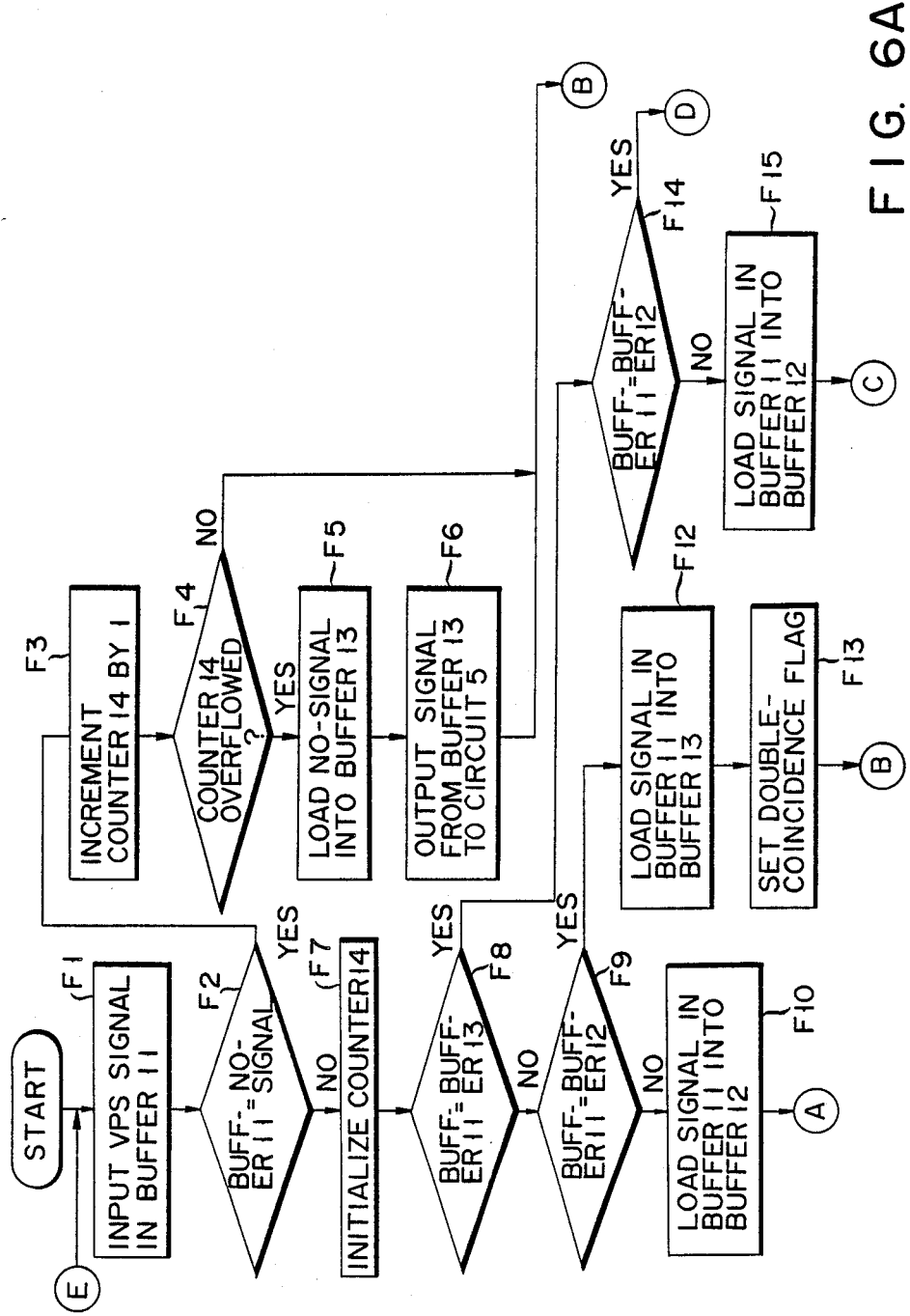
FIGS. 6A and 6B are a first embodiment flowchart for determining VPS signals by means of the VPS signal determination circuit.
Figure 6B:
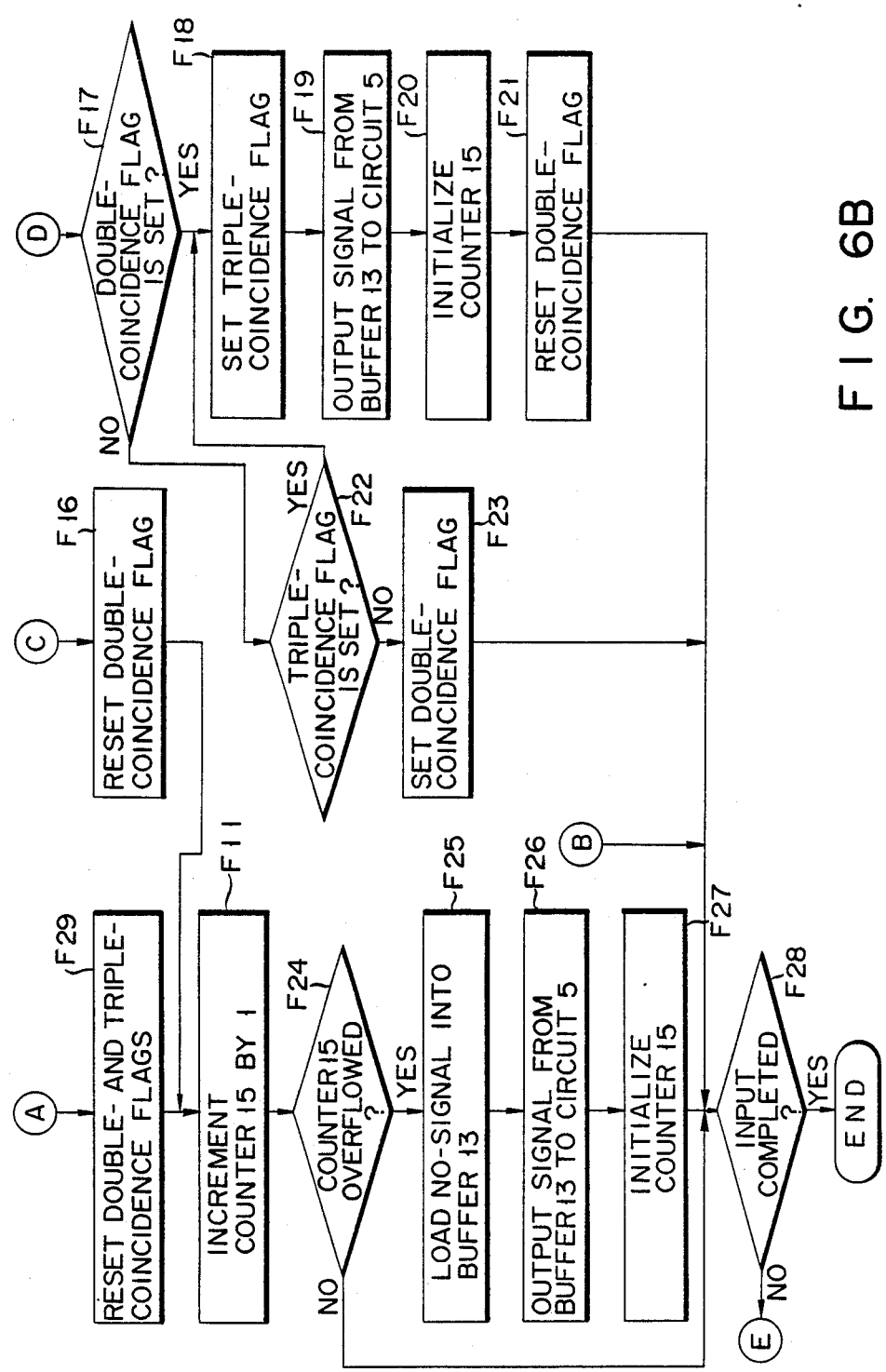
Figure 7:
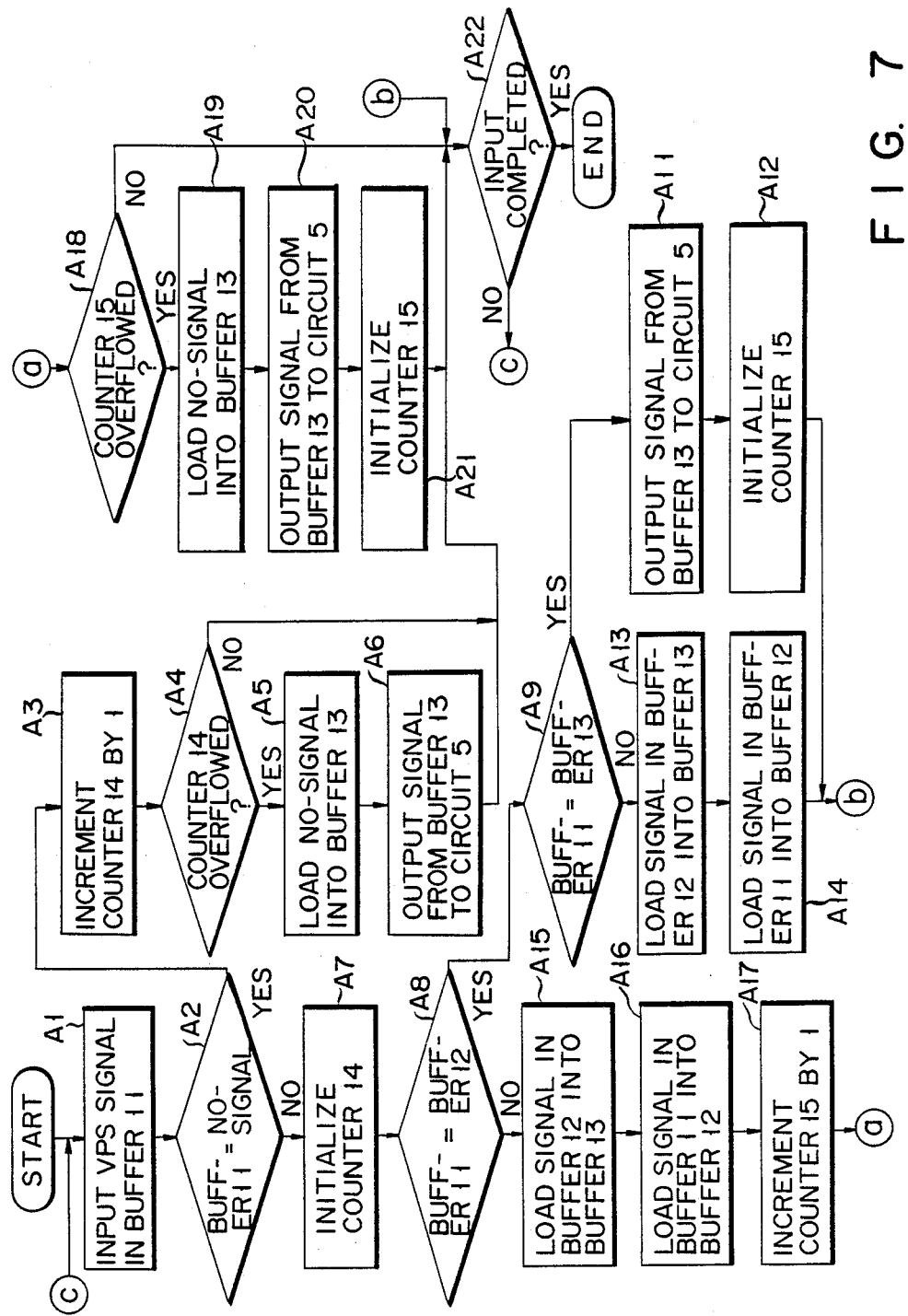
FIG. 7 is a second embodiment flowchart for determining VPS signals by means of the VPS signal determination circuit.

Upon the start of the operation of a first embodiment as shown in FIGS. 6A and 6B, a VPS signal is detected from a television signal and then input into input buffer 11 (step F1).

In step F2, determination process circuit 21 determines whether the VPS signal input into input buffer 11 is a no-signal or not. When the VPS signal is a no-signal, no-signal counter 14 is incremented by one (step F3). No-signal counter 14 is designed to overflow when over n no-signals are successively input, that is, when no-signal counter 14 are counted over n times. In step F4, the status of no-signal counter 14 is determined. When no-signal counter 14 overflows, the no-signal is loaded into memory buffer 13 (step F5). The no-signal stored in memory buffer 13 is used as a VPS signal for controlling VTR 9 and TV 10 and thus output to comparing circuit 5 (step F6).

When the VPS signal input into input buffer 11 is a normal signal, no-signal counter 14 is initialized (step F7) and a comparison is made between the VPS signal stored in input buffer 11 and the VPS signal stored in memory buffer 13 (step F8). When no coincidence occurs between the VPS signals, another comparison is made between the VPS signal stored in input buffer 11 and the VPS signal stored in memory buffer 12 (step F9). When no coincidence occurs between the VPS signals in step F9, the VPS signal stored in input buffer 11 is regarded as a new input signal and loaded into memory buffer 12 (step F10). If a twice-coincidence flag representing that two normal VPS signals of the same type are successively input and a triple-coincidence flag representing that three normal VPS signals of the same type are successively input have both been set in determination process circuit 21, these flags are reset in step F29. Further, error counter 15 is incremented by one (step F11).

In step F9, when a coincidence occurs between the VPS signal stored in input buffer 11 and the VPS signal stored in memory buffer 12, the VPS signal in input buffer 11 is loaded into memory buffer 13 (step F12), and the twice-coincidence flag is set (step F13).

In step F8, when a coincidence occurs between the VPS signal in input buffer 11 and the VPS signal in memory buffer 13, the VPS signal in input buffer 11 is compared with the VPS signal in memory buffer 12 (step F14). When no coincidence occurs between the VPS signals, the VPS signal in input buffer 11 is loaded into memory buffer 12 (step F15). The twice-coincidence flag is reset in step F16, and error counter 15 is incremented by one in step F11.

If a coincidence occurs between the VPS signal in input buffer 11 and the VPS signal in memory buffer 12 in step F14, then determination process circuit 21 determines whether or not the twice-coincidence flag is set in step F17. If the flag has already been set, it is determined that the same normal VPS signals have been input successively three times, or a triple-coincidence has occurred. Thus the triple-coincidence flag is set in step F18. The VPS signal in memory buffer 13 is output to comparing circuit 5 as the VPS signal adapted for controlling VTR 9 and TV 10 (step F19). Error counter 15 is initialized (step F20), and the twice-coincidence flag is reset (step F21). If no twice-coincidence flag is set in step F17, then determination process circuit 21 determines whether or not the triple-coincidence flag is set (step F22). If the triple-coincidence flag is set in step F22, the operations of steps F18 through F21 are carried out. If no triple-coincidence flag is set, then the twice-coincidence flag is set (step F23).

When various kinds of normal VPS signals are input into input buffer 11, error counter 15 in incremented by one each time the VPS signal changes in kind (step F11). If error counter 15 exceeds a predetermined count, i.e,. overflow in step F24, then a determination of occurrence of an abnormal input state is made so that a no-signal is loaded into memory buffer 13 (step F25). The VPS signal in memory buffer 13 is output to comparing circuit 5 as a VPS signal used for controlling VTR 9 and TV 10 (step F26). Moreover, error counter 15 is initialized (step F27).

The above operations are performed at regular intervals and continued for a predetermined period (step F28).

Upon the start of determination process according to a second embodiment as shown in FIG. 7, a VPS signal is detected from a television signal and input into input buffer 11 (step A1). In step A2, determination process circuit 21 determines whether or not the VPS signal input into input buffer 11 is a no-signal. When the VPS signal is a no-signal, no-signal counter 14 is incremented by one (step A3). No-signal counter 14 is designed to overflow when over n no-signals are successively input into input buffer 11. When no-signal counter 14 overflows (step A4), the no-signal is loaded into memory buffer 13 (step A5) and then the no-signal stored in memory buffer 13 is output to comparing circuit 5 as a VPS signal used for controlling VTR 9 and TV 10 (step A6).

When the VPS signal input into input buffer 11 is a normal VPS signal, no-signal counter 14 is initialized (step A7), and the VPS signal in input buffer 11 is compared with the VPS signal in memory buffer 12 (step A8). When, in step A8, the VPS signal in input buffer 11 and the VPS signal in memory buffer 12 coincide with each other, a comparison is made between the VPS signal input buffer 11 and the VPS signal in memory buffer 13 (step A9). If a coincidence occurs between the VPS signal in input buffer 11 and the VPS signal in memory buffer 13 in step A9, then it is determined that the same normal VPS signals have successively been input three times. As a result, the VPS signal in memory buffer 13 is output to comparing circuit 5 as a VPS signal used for controlling VTR 9 and TV 10 (step A13). And, error counter 15 is initialized (step A12).

If no coincidence occurs between the VPS signal in input buffer 11 and the VPS signal in memory buffer 13 in step A9, then the VPS signal in memory buffer 12 is loaded into memory buffer 13 (step A13), and the VPS signal in input buffer 11 is loaded into memory buffer 12 (step A14).

If no coincidence occurs between the VPS signal in input buffer 11 and the VPS signal in memory buffer 12 in step A8, then the VPS signal in memory buffer 12 is loaded into memory buffer 13 (step A15), and the VPS signal in input buffer 11 is loaded into memory buffer 12 (step A16). Further, error counter 15 is incremented by one (step A17).

In step A18, when error counter 15 exceeds a predetermined count, i.e., error counter 15 overflows, the no-signal is loaded into memory buffer 13 (step A19), and the VPS signal in memory buffer 13 is output to comparing circuit 5 (step A20). Further, error counter 15 is initialized (step A21).

The above operations are performed at regular intervals and continued for a predetermined period (step A22).

Subsequently, examples of the determination of the VPS signals will be described with reference to FIGS. 8A–8C.

Figure 8A:
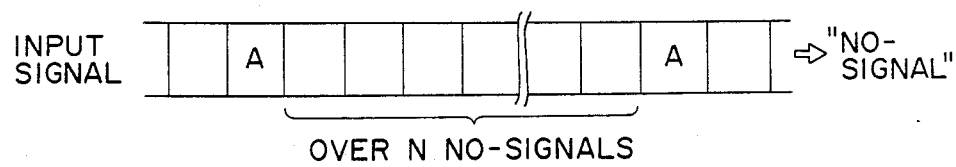
FIGS. 8A through 8C show examples of the determination of VPS signals according to the VPS signal determination circuit of FIG. 5.
Figure 8B:
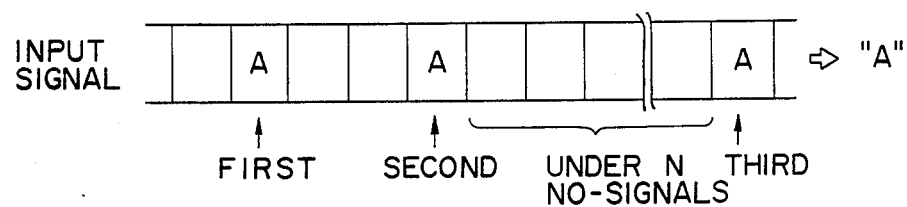
Figure 8C:
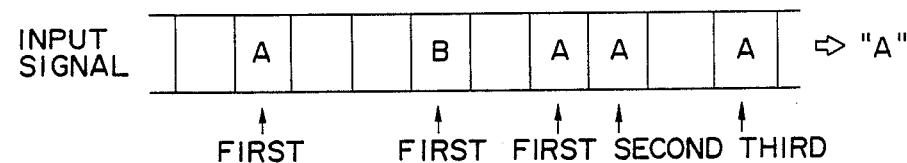

As shown in FIG. 8A, when over n no-signals are successively input, VPS signals used for controlling a VTR and a TV are regarded as no-signals. As shown in FIG. 8B, when three signals (program A) are input in succession (including the case where under n no-signals are successively input between the signals (program A), the signals are regarded as VPS signals used for controlling VTR and TV. Further, as shown in FIG. 8C, when a signal for program B is input between signals (program A), the continuity of signals (program A) will be lost. When three signals (program A) are successively input again after the input of the signal for program B, the signals (program A) are regarded as the VPS signals used for controlling VTR and TV.

Although the preferred embodiments of the present invention have been described and disclosed, it is apparent that other embodiments and modifications of the invention are possible.

For instance, while in the illustrated preferred embodiments, two memory buffers are used for determining three normal VPS signals of the same program which are successively input, the present invention may be applied to the determination of four or five VPS signals which are successively input. In this case, three or four memory buffers will be needed.

What is claimed is:

1. A method for determining a video program system signal detected from a television signal, the method comprising the steps of:
    storing the video program system signal detected from the television signal;
    determining whether or not the stored video program system signal is a no-signal or a normal signal;
    counting a no-signal count value when the stored video program system signal is the no-signal;
    outputting the no-signal when the no-signal count value exceeds a first predetermined count value;
    determining whether or not the stored video program system signal is a normal signal which differs from a previously stored normal signal;
    counting an error count value when different normal signals are stored;
    outputting the no-signal when the error count value exceeds a second predetermined count value; and outputting the stored normal signal when a predetermined number of normal signals are continuously stored.

2. A system for determining a video program system signal detected from a television signal, the system comprising:
   input buffer means for storing the video program system signal detected from the television signal;
   determining means for determining whether the video program system signal stored in the input buffer means is a normal signal in accordance with predetermined criteria;
   memory buffer means for storing the video program system signal stored in the input buffer means in accordance with a determination result obtained by the determining means;
   error count means for counting an error count value in accordance with the determination result obtained by the determining means; and
   no-signal counter means for counting a no-signal count value in accordance with another determination result obtained by the determining means.

3. A system according to claim 2, wherein the memory buffer means includes at least one memory.

4. A system according to claim 2, wherein the no-signal is output when the count value of the no-signal counter means exceeds a predetermined count value.

5. A system according to claim 2, wherein the video program system signal stored in the memory buffer means is output when a predetermined number of normal signals are continuously stored in the input buffer means.

6. A system according to claim 2, wherein the error count value of the error counter means is counted when the normal signal stored in the input buffer means and the normal signal stored in the memory buffer means differ with each other.

7. A system according to claim 2, wherein the no-signal count value of the no-signal counter means is counted when the video program system signal stored in the input buffer means is a no-signal.

8. A system for determining a video program system signal detected from a television signal, the system comprising:
   storing means for storing the video program system signal detected from the television signal;
   first determining means for determining whether or not the video program system signal stored in the storing means is a no-signal;
   no-signal counter means for counting a no-signal count value when the video program system signal stored in the storing means is the no-signal;
   first outputting means for outputting the no-signal when the no-signal count value of the no-signal counting means exceeds a first predetermined count value;
   second determining means for determining whether or not the video program system signal stored in the storing means is a normal signal and whether it differs from a previously stored normal signal;
   error counter means for counting an error count value when different normal signals are stored in the storing means;
   second outputting means for outputting the no-signal when the error count value of the error counter means exceeds a second predetermined count value; and
   third outputting means for outputting the video program system signal stored in the storing means when a predetermined number of normal signals are continuously stored in the storing means.

* * * * *